B. MacDONALD.
APPARATUS FOR TREATING ORES.
APPLICATION FILED MAY 6, 1914.
1,139,428.
Patented May 11, 1915.
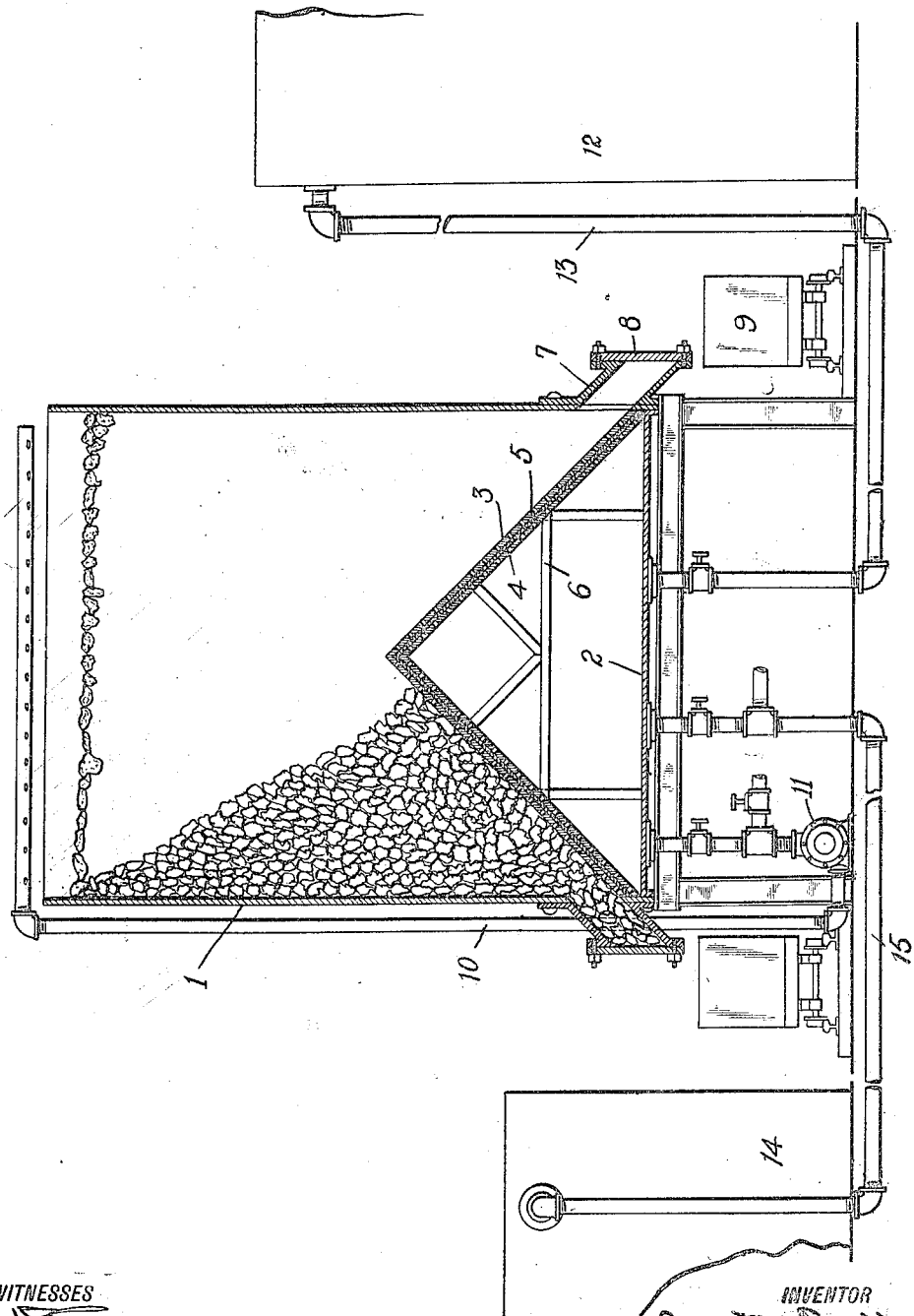

UNITED STATES PATENT OFFICE.

BERNARD MacDONALD, OF SOUTH PASADENA, CALIFORNIA.

APPARATUS FOR TREATING ORES.

1,139,428.

Specification of Letters Patent. Patented May 11, 1915.

Application filed May 6, 1914. Serial No. 836,622.

*To all whom it may concern:*

Be it known that I, BERNARD MACDONALD, a citizen of the United States, residing at South Pasadena, county of Los Angeles, State of California, have invented certain new and useful Improvements in Apparatus for Treating Ores; and I do hereby declare the following to be a full, clear, and exact description of the invention, such as will enable others skilled in the art to which it appertains to make and use the same.

This invention relates to apparatus for treating ores and is directed to the provision of apparatus for treating crude or roasted porous ores, especially copper ores, of a granular or lumpy character which may be leached by percolation through a mass of the ore or water or a solution of a suitable chemical.

The object of the invention is to provide ore-treating apparatus which is efficient and economical in leaching out the metals contained in crude or roasted ores of a coarse or granular character and to provide means whereby air or a suitable gas may be introduced into the mass of ore during the course of the leaching operation to facilitate the chemical reactions necessary for dissolving out the metals from the ore.

In accordance with the invention, a tank or bin is provided for the reception of the coarse ore to be treated and this is provided with a false bottom presenting an inclined upper surface. This inclined bottom surface is the support for the ore and facilitates the discharge of the ore after the values contained therein have been dissolved. The false bottom is formed of suitable permeable material through which the solution carrying the dissolved metals may percolate into a chamber between the false bottom and the true bottom of the tank. Suitable transfer pipes are provided for transferring the solution entering the chamber at the bottom of the tank to the top of the tank and upon the ore therein so that the solution may again percolate through the ore and take up more of the values contained therein. Also a connection is made to the chamber between the false bottom and the water-tight bottom of the tank through which the solution may be conveyed to a precipitation tank. Means are also provided for conveying air or a suitable gas to the chamber at the bottom of the tank so that such air or gas may pass into the body of ore within the tank, it being uniformly distributed by the permeable false bottom of the tank. Such air or gas coming in contact with the ore will serve to oxidize the metal contained in the ore or cause such chemical change therein as will facilitate the leaching out of the values by the solution percolating through the ore. Such air or gas may be introduced into the tank through the false bottom thereof while the solution is being allowed to percolate through the ore or the introduction of the solution and the gas may take place alternately. If desired, provision may be made for exhausting the chamber at the bottom of the tank so that the vacuum condition prevailing therein will assist in drawing the solution through the body of ore.

I have illustrated the preferred embodiment of my invention in the accompanying drawings which show the apparatus in sectional elevation.

Referring to these drawings, 1 indicates a water-tight tank which is preferably rectangular of cross section and consists of vertically disposed wooden staves. The tank has a water-tight bottom as shown at 2. Also, it has a false bottom arranged above the water-tight bottom 2 and forming a chamber at the lower end of the tank 1. This false bottom is arranged so that its upper surface is inclined. In the present instance, the false bottom consists of two sloping walls forming a gable extending across the bottom of the tank. The false bottom is so constructed as to permit a liquid to seep through it to the chamber underlying it, and at the same time, form a support for the ore which is of a coarse or granular form. The false bottom preferably consists of two layers 3 and 4 of perforated boards having a layer of suitable fibrous material 5 such as asbestos cloth or canvas between them. This false bottom may be supported in any suitable manner upon the bottom 2 of the tank, as for instance, by the framework 6 shown in the drawing. The tank 1 is provided with one or more exits through which the leached ore may be withdrawn. In the present instance, two chutes 7 are shown at opposite sides of the tank having the bottom walls thereof formed as continuations of the false bottom of the tank. These chutes 7 are adapted to be closed water-tight by suitable gates 8.

The chutes 7 may be arranged to discharge the leached ore upon suitable means for conveying it to a dump; in the present instance, cars 9 are shown running on rails extending under the chutes and adapted to receive the ore therefrom.

Means are provided for transferring liquid from the chamber under the false bottom of the tank to the top of the tank and upon the ore therein so that the liquid will pass several times through the ore and thus take up a substantial amount of the values contained therein. For this purpose, a transfer pipe is shown at 10 having its upper outlet end extended over the wall of the tank so as to discharge the solution upon the ore in the tank. The opposite end of this transfer pipe is connected to the chamber at the bottom of the tank through an opening in the water-tight bottom 2. A pump is shown at 11 connected in the pipe 10 for causing the flow of the solution through pipe 10. It will be understood that any form of pumping means may be utilized for this purpose, such for instance, as a pump of ordinary construction or a means for injecting compressed air into the transfer pipe to force the solution upward therein.

When the solution has become sufficiently charged with the ore values, it is conveyed to a precipitation tank. Such a tank is indicated diagrammatically at 12. It is connected by a pipe 13 to the chamber under the false bottom of the ore-receiving tank. The solution may be pumped through the pipe 13 or it may be arranged to flow by gravity therethrough into the precipitation tank 12.

Means are also provided by introducing air or a gas into the chamber at the bottom of the tank so that such air or gas will be distributed uniformly by the permeable false bottom and will pass into and rise through the ore within the tank. A receptacle for the gas is shown at 14 and a pipe 15 leads from this receptacle to the chamber between the false and water-tight bottoms of the tank. In some cases, the introduction of air or gas into the tank in this manner is unnecessary and it may be found to be desirable to assist the solution in its flow through the ore.

In utilizing the apparatus, the tank 1 is filled with the ore to be leached, this being in a course or granular form and then the treating solution is introduced into the top of the tank in any suitable manner, as for instance, through the transfer pipe or pipes 10. This solution percolates through the ore and finally reaches the bottom of the body of ore, having taken up more or less of the values from the ore.

The solution then passes through the false bottom into the chamber under it where it collects. From this chamber the solution may be carried up to the top of the tank again through the transfer pipes and in this way it may be caused to pass through the body of ore several times until it becomes thoroughly impregnated with the ore values. The solution collecting in the chamber may then be carried to the precipitation tank 12 through the pipe 13 for the extraction of the ore therefrom. During the course of this operation or at intervals therein when the solution is temporarily withdrawn from the tank, air or gas may be introduced into the ore in the tank for the purpose of oxidizing it or otherwise causing such chemical reaction as will facilitate the leaching out of the metals when the solution is again admitted to the tank. Such air or gas may be admitted from the receptacle 14 through pipe 15 to the chamber under the false bottom and it will be distributed by the false bottom so that it rises through the entire body of ore within the tank. The leaching operation having been completed and the solution having been drawn off for precipitation, the ore remaining in the tank may be drawn off through the chutes 7 into the cars 9 for conveyance to the dump.

I claim:

1. In an apparatus for treating ore, the combination of a tank provided with a water tight bottom, an inclined perforated false bottom within the tank forming a chamber between it and the water tight bottom, into which chamber the liquid with which the ore is treated will precolate, a transfer pipe having its lower end communicating with said chamber and having its upper end arranged to deliver liquid into the tank at the top thereof, means to force the liquid which has percolated into said tank to flow therefrom upwardly through said transfer pipe whereby it will be discharged upon the ore within the tank, a precipitation tank, a pipe having one end communicating with said chamber and having its other end communicating with said precipitation tank, a receptacle for a gas, and a pipe extending between said receptacle and said chamber, substantially as described.

2. In an apparatus for treating ore, the combination of a tank provided with a water tight bottom, an inclined perforated false bottom within the tank forming a chamber between it and the water tight bottom, into which chamber the liquid with which the ore is treated will percolate, a transfer pipe having its lower end communicating with said chamber and having its upper end arranged to deliver liquid into the tank at the top thereof, means to force the liquid which has percolated into said tank to flow therefrom upwardly through said transfer pipe whereby it will be discharged upon the ore within the tank, a discharge chute at the bottom of the inclined false bottom, a closure for the chute adapted to be opened to permit the removal of the treated ore from the tank, a precipitation tank, a pipe having one end communicating with said chamber and having its other end communicating with said precipitation tank, a receptacle for a gas, and a pipe extending between said receptacle and said chamber, substantially as described.

In testimony whereof I affix my signature, in presence of two witnesses.

BERNARD MacDONALD.

Witnesses:
 OLEV HIBBARD,
 FLORENCE V. HALL.